(12) United States Patent
Fouquet et al.

(10) Patent No.: US 6,324,316 B1
(45) Date of Patent: Nov. 27, 2001

(54) FABRICATION OF A TOTAL INTERNAL REFLECTION OPTICAL SWITCH WITH VERTICAL FLUID FILL-HOLES

(75) Inventors: Julie E. Fouquet, Portola Valley; Datong Chen, Sunnyvale, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/549,741

(22) Filed: Apr. 14, 2000

Related U.S. Application Data

(63) Continuation of application No. 09/025,892, filed on Feb. 18, 1998, now Pat. No. 6,055,344.

(51) Int. Cl.[7] .............................. G02B 6/35; H01L 21/70
(52) U.S. Cl. ............................... 385/16; 385/17; 385/18; 437/20; 437/21; 437/51
(58) Field of Search .................................. 385/15, 16, 17, 385/18, 19, 20, 21, 22, 23, 14; 437/20, 21, 51, 129, 130, 117, 131, 132

(56) References Cited

U.S. PATENT DOCUMENTS

| | | | |
|---|---|---|---|
| 4,505,539 | * | 3/1985 | Auracher et al. ................. 385/18 X |
| 4,988,157 | | 1/1991 | Jackel et al. ....................... 385/18 X |
| 5,280,012 | * | 1/1994 | Kirlin et al. ............................... 505/1 |
| 5,453,494 | * | 9/1995 | Kirlin et al. ............................. 534/15 |
| 5,653,008 | * | 8/1997 | Sim et al. ............................... 29/600 |
| 5,699,462 | * | 12/1997 | Fouquet et al. ......................... 385/18 |
| 6,055,344 | * | 4/2000 | Fouquet et al. ......................... 385/16 |
| 6,229,640 | * | 5/2001 | Zhang .................................... 385/18 |

\* cited by examiner

Primary Examiner—Brian Healy

(57) ABSTRACT

A method of fabricating a switching element or a matrix of switching elements includes providing a waveguide substrate having at least two waveguides that intersect at a trench such that optical coupling between the waveguides is dependent upon the presence or absence of an index-matching fluid at the intersection of the waveguides with the trench. Fluid is supplied to the trench via a fluid fill-hole that extends through a heater substrate in a direction that is generally perpendicular to a substrate surface on which at least one heater is fabricated. In the preferred embodiment, the fluid fill-hole is formed in a step of inductively coupled plasma (ICP) reactive ion etching (RIE). The waveguide substrate having at least two waveguides and the heater substrate having the heaters and the fill-hole are bonded together after the substrates are aligned such that the trench is in fluid communication with at least one fluid fill-hole and is in thermal communication with at least one heater. Optical fibers are then coupled to the waveguides. Preferably, a structurally weakened edge portion is formed during the ICP RIE step so that the edge portion can be removed after the two substrates are bonded, allowing uninhibited access of the optical fibers to the waveguides.

16 Claims, 13 Drawing Sheets

FABRICATION OF A TOTAL INTERNAL REFLECTION OPTICAL SWITCH WITH VERTICAL FLUID FILL-HOLES

CROSS REFERENCE TO RELATED APPLICATION

This application is a continuation of Ser. No. 09/025,892, filed on Feb. 18,1998, now U.S. Pat. No. 6,055,344.

TECHNICAL FIELD

The invention relates generally to optical switching elements and more particularly to methods of fabricating switches in which optical coupling among waveguides is determined by manipulating fluid.

BACKGROUND ART

While signals within telecommunications and data communications networks have been traditionally exchanged by transmitting electrical signals via electrically conductive lines, an alternative medium of data exchange is the transmission of optical signals through optical fibers. Equipment for efficiently generating and transmitting the optical signals has been designed and implemented, but the design of optical switches for use in telecommunications and data communications networks is problematic.

U.S. Pat. No. 5,699,462 to Fouquet et al., which is assigned to the assignee of the present invention, describes a switching matrix that may be used for routing optical signals from any one of a number of parallel input optical fibers to any one of a number of parallel output optical fibers. A functionally related matrix of switching elements is described in U.S. Pat. No. 4,988,157 to Jackel et al. An isolated switching element 10 is shown in FIG. 1, while a 4×4 matrix 32 of switching elements is shown in FIG. 2. The optical switch of FIG. 1 is formed on a substrate. The substrate may be a silicon substrate, but other materials may be used. The optical switch 10 includes planar waveguides defined by a lower cladding layer 14, a core 16 and an upper cladding layer 18. The core is primarily silicon dioxide, but with other materials that affect the index of refraction of the core. The cladding layers should be formed of a material having a refractive index that is substantially different from the refractive index of the core material, so that optical signals are guided along the core material.

The core material 16 is patterned to define an input waveguide 20 and an output waveguide 26 of a first waveguide path and to define an input waveguide 24 and an output waveguide 22 of a second waveguide path. The upper cladding layer 18 is then deposited over the patterned core material. A trench 28 is etched through the core material and the two cladding layers to the substrate. The waveguides intersect the trench at an angle of incidence greater than the critical angle of total internal reflection (TIR) when the trench is filled with a vapor or gas. Thus, TIR diverts light from the input waveguide 20 to the output waveguide 22, unless an index-matching material is located within the gap between the aligned waveguides 20 and 26. The trench 28 is positioned with respect to the four waveguides such that one sidewall of the trench passes through or slightly offset from the intersection of the axes of the waveguides.

In the 4×4 matrix 32 of FIG. 2, any one of four input waveguides 34, 36, 38 and 40 may be optically coupled to any one of four output waveguides 42, 44, 46 and 48. The switching arrangement is referred to as "non-blocking," since any free input fiber can be connected to any free output fiber regardless of which connections have already been made through the switching arrangement. Each of the sixteen optical switches has a trench that causes TIR in the absence of an index-matching liquid at the gap between collinear waveguides, but collinear waveguides of a particular waveguide path are optically coupled when the gaps between the collinear waveguides are filled with an index-matching fluid. Trenches in which the waveguide gaps are filled with fluid are represented by fine lines that extend at an angle through the intersections of optical waveguides in the array. On the other hand, trenches in which there exist an absence of index-matching fluid at the gaps are represented by broad lines through a point of intersection.

The input waveguide 20 of FIGS. 1 and 2 is in optical communication with the output waveguide 22, as a result of reflection at the empty gap of trench 28. Since all other cross points for allowing the input waveguide 34 to communicate with the output waveguide 44 are in a transmissive state, a signal that is generated at input waveguide 34 will be received at output waveguide 44. In like manner, input waveguide 36 is optically coupled to the first output waveguide 42, the third input waveguide 38 is optically coupled to the fourth output waveguide 48, and the fourth input waveguide 40 is coupled to the third output waveguide 46.

There are a number of available techniques for changing an optical switch of the type shown in FIG. 1 from a transmissive state to a reflective state. In the above-identified patent to Jackel et al., water or a refractive index-matching liquid resides within the gap between waveguides until an electrochemically generated bubble is formed. A pair of electrodes is positioned to electrolytically convert the liquid to gaseous bubbles. A bubble at the gap between collinear waveguides creates an index mismatch and causes light to be reflected at the sidewall of a trench. The bubble can be destroyed by a second pulse having the appropriate polarity. Removing the bubble returns the switch to the transmissive state.

Japanese application No. 6-229802 of Sato et al. (Kokai No. 8-94866) describes the use of heaters to supply and remove index-matching liquid to and from a gap that is intersected by two waveguides. The flow of liquid within a slit (i.e., trench) is controlled by selectively activating heater elements. The index-matching liquid may be a low viscosity silicon oil. Approximately one-third of the volume of the slit is filled with such liquid prior to bonding a surface cap substrate to a substrate on which the waveguides are fabricated. The fixed quantity of sealed liquid is manipulated by selectively activating one of two heater elements. Activating a first heater element locates the sealed liquid at the gap between two waveguides, while activating a second heater element removes the liquid from the gap between the waveguides.

If the liquid in the Sato et al. device were to be channeled to the trenches from the edge of the switching device, the channels would require significant space on the device footprint. The waveguides, the heaters and the thin-film electrical connections to the heaters must be properly mapped and fabricated. The concern is that the additional requirement of forming the channels would cause space requirements to exceed space availability. In an exemplary application, the center-to-center distance between parallel waveguides may be 250 μm in order to match the pitch of conventional optical fiber ribbon cables. Design and production of liquid-feed channels having a sufficient volume for ensuring proper operation of the switching elements would be difficult in such an application. Another concern is that if the additional channels are formed in the waveguide substrate, there may be additional optical loss in the device.

Conversely, the concern with sealing the index-matching liquid within the trench, as taught by Sato et al., is that the volume of liquid cannot be adjusted after the device is fully assembled. That is, liquid cannot be added or removed if it is determined that the sealed volume is not optimal.

What is needed is a fabrication method and a switching device that provide sufficiently large fluid fill-channels to trenches that are intersected by closely spaced waveguides, with the formation of the fluid feed-channels not impeding upon the process of fabricating the switch structure.

SUMMARY OF THE INVENTION

A method of fabricating a switching element includes providing a waveguide substrate and a heater substrate, and includes forming at least one fluid fill-hole through the heater substrate in a direction generally perpendicular to the major surfaces of the heater substrate. The waveguide substrate has at least two optical waveguides, including first and second waveguides that intersect at a trench. The optical coupling between the first and second waveguides is dependent upon the presence or absence of a fluid at the intersection of the waveguides with a trench. With the completion of the fill-hole, heater and waveguide structures, the two substrates are aligned and bonded, such that the trench is in fluid communication with at least one fill-hole through the heater substrate and is in thermal communication with at least one heater on the surface of the heater substrate.

In the preferred embodiment, there are dielectric layers on the opposite sides of the heater substrate prior to the steps of forming heaters and fluid fill-holes. The dielectric can be thermal oxide, such as silicon dioxide ($SiO_2$). The heaters are formed on one surface of the heater substrate using fabrication techniques that are conventional to the fabrication of heaters for inkjet printheads. In addition to forming heaters, a conductive layer is patterned to provide electrical leads from the heaters to bond pads for connection to heater drive-circuitry. While a single switching element may be formed using the invention, a matrix of switching elements is typically formed. In the preferred embodiment, each switching element is selectively switched from a transmissive state to a reflective state by creating and/or moving a bubble within the trench. In the embodiment in which the bubble is moved into and out of the gap between the ends of waveguides, there are two heaters for each switching element. A first heater is positioned at the gap between the waveguide ends, and the other heater is aligned with the trench that includes the gap, but at a distance from the first heater. Also, in the preferred embodiment, each trench is aligned with two or more fluid fill-holes. By placing fluid fill-holes on both sides of the gap, bubble motion is more reliably controlled.

Forming the fluid fill-holes through either the heater substrate or the waveguide substrate is problematic. Waveguide structures that comprise waveguide layers on a silica substrate do not accommodate the use of drilling techniques to form fluid fill-holes that are sufficiently small. For waveguide structures on silicon substrates, conventional wet etching techniques (such as KOH or EDP) do not provide desired results, since waveguides may be only 250 $\mu$m apart but are fabricated on commercial silicon wafers having a thickness of 500 $\mu$m to 1 mm. Since the slope of the wet-etched sidewalls is approximately 55°, the fluid fill-holes tend to merge horizontally before the vertical etching is completed. Thinner wafers may be used to decrease the vertical etch dimension, but the reduced thickness creates additional concerns relating to handling, wafer bowing and breakage.

Drilling techniques may be used to penetrate the heater substrate with near-vertical sidewalls. One technique is sand drilling, but the state of the art with regard to this technique does not easily accommodate its use to form the fluid fill-holes. It is difficult to fabricate the necessary metal "drill bit," a part with a very narrow diameter hole with a 50:1 aspect ratio, to focus the sand spray. Another technique is laser drilling, that can fabricate holes with the required aspect ratio, but the heat generated by this operation may melt any circuitry within a few hundred microns of the fill-hole. This result is unacceptable in applications in which the heaters and the conductive leads to the heaters are closely spaced on the front surface of the heater substrate. Both of these drilling processes are relatively slow because each hole must be drilled individually.

A drilling technique that operates well for forming the fluid fill-holes vertically through a substrate is referred to as inductively coupled plasma (ICP) reactive ion etching (RIE). ICP is based on the principle of generating a time-varying axial magnetic field to induce an electric field which effectively confines plasma current. The process includes alternately applying an etch gas and a passivation gas. The anisotropic etching of silicon wafers using ICP RIE for forming micro electromechanical systems (MEMS) has been developed by STS Ltd (Surface Technology Systems) of Wales, United Kingdom. This process has the advantage of forming all the holes simultaneously.

As previously noted, there are preferably thermal oxidation layers on opposite surfaces of the heater substrate. One of the thermal oxidation layers is patterned to define the positions of the fluid fill-holes, while the other thermal oxidation layer is used as an etch stop. The ICP RIE technique has a high selectivity in etching the substrate relative to the thermal oxidation layer. The thermal oxidation etch-stop layer is left intact, but with a reduced attachment. However, lateral etching (i.e., undercut etching) will occur after the vertical etching reaches the heater surface, unless the ICP RIE step is terminated upon reaching the thermal oxide layer at the exit. One concern is that if the etch direction is from the back surface of the heater substrate to the surface having the heaters and leads, lateral etching will remove the substrate material (e.g., silicon) supporting the circuitry near the holes. Since the etch rate is more rapid at the edge of the substrate than at the center, holes at the edge potentially undergo considerable lateral etching before holes penetrate to the thermal oxidation layer on the exit side at the center of the substrate. Thus, the preferred embodiment is one in which the etch direction is from the heater surface to the back surface.

Following the formation of the fluid fill-holes, the heater substrate is bonded to the waveguide substrate. Liquid adhesives of the type that are appropriate for spin-on application are preferred to the thicker dry film adhesives that are often used in inkjet fabrication. The liquid adhesives provide a thinner bonding layer (5 $\mu$m or less) than the dry film adhesives (between 12 and 50 $\mu$m). Moreover, it is preferred to spin the adhesive on the heater substrate, rather than the waveguide substrate, since (1) it is less likely to adversely affect the optical properties of the resulting device, (2) it is less tedious and more reproducible than applying the adhesive to the diced waveguide structures typically used, (3) the waveguide structures are more expensive than the heater structures and, consequently, should not be used for process development that has less than an optimal yield, and (4) the spun film will be more uniform over the heater wafer, due to its smaller variations in topology.

If the etch direction in the ICP RIE step is from the back surface to the heater surface of the heater substrate, a thermal oxidation layer is preferably left when the adhesive layer is applied. The thermal oxidation layer functions as a membrane over the fluid fill-holes during the application of the adhesive layer, thereby accommodating the formation of a uniformly thick adhesive layer. The membranes then can be easily removed by rupturing with pressure from a gas gun or with an additional etching step.

Another concern is that the ends of the waveguides at the edges of the waveguide substrate may not be sufficiently exposed to obtain a coupling loss after the heater substrate has been bonded in position. In one embodiment, the vertical distance from the center of a waveguide to an upper cladding layer is only 25 $\mu$m, while the distance from the center of a conventional optical fiber to the outside of the cladding of the fiber is 62.5 $\mu$m. Thus, the fiber will tend to contact the heater substrate before reaching the edge of the waveguide. Preferably, the edge portion of the heater substrate is structurally weakened before the two substrates are bonded together. While individual waveguide substrates may be bonded to individual heater substrates, typically the waveguide substrates are individually bonded to a wafer that includes an array of "heater substrates." The wafer is then diced to provide a batch of switching devices, each having a matrix of switching elements. The structurally weakened edge portion is removed after the bonding step.

In the preferred embodiment, the structural weakening is achieved during the ICP RIE step. A series of small, spaced through-holes, a continuous line, or a combination of small through-holes and one or more slots may be formed to provide a perforation that defines the structurally weakened edge portion. These smaller features are etched most of the way, but preferably not all of the way, through the wafer. The edge portions can be subsequently removed without requiring a step of sawing the edge portion.

DETAILED DESCRIPTION

Figure 3:
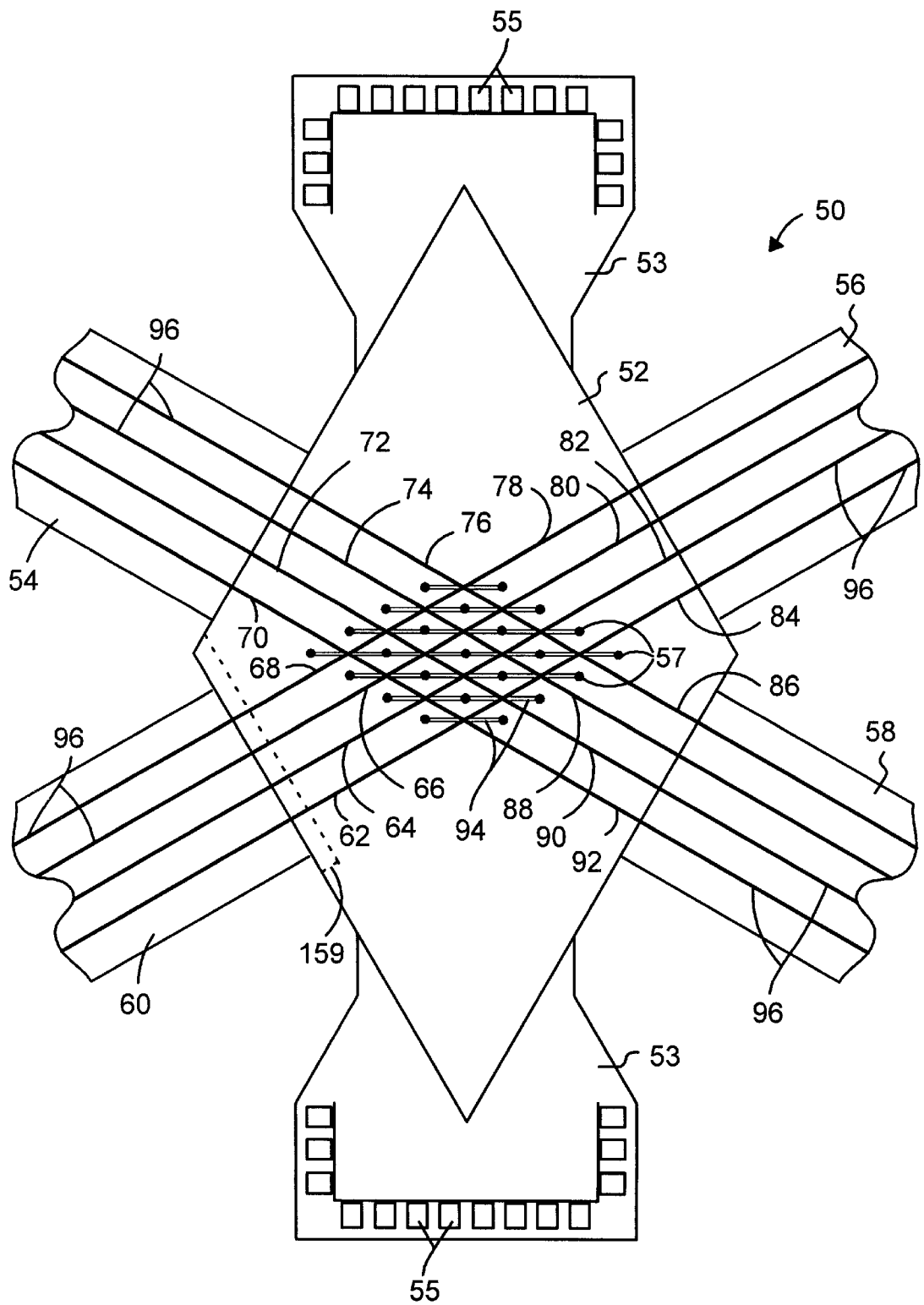
FIG. 3 is a top view of a matrix of switching elements having optical paths that intersect trenches that are supplied with fluid in accordance with the invention.

With reference to FIG. 3, a matrix 50 of switching elements includes a waveguide substrate 52 that is attached to four fiber array substrates 54, 56, 58 and 60. The waveguide substrate is preferably a silicon or silica chip, but other materials may be used.

The waveguide substrate 52 is shown atop a heater substrate 53. The heater substrate is preferably formed of a material that accommodates the use of techniques for forming conventional features of an inkjet printhead, such as heaters and interconnects that extend from the heaters to bond pads 55 at the edges of the heater substrate. The bond pads are then connected to heater drive circuitry, not shown, for operating the heaters. As will be explained fully below, fluid fill-holes 57 are formed within the heater substrate to supply an index-matching fluid to trenches 94 on the surface of the waveguide substrate 52. Acceptable materials for the heater substrate 53 include silicon and silica.

The waveguide substrate 52 has a four-sided configuration. If the substrate is square and each waveguide is fabricated to extend perpendicularly from an edge of the substrate, each optical switching element will be substantially identical to the switching element 10 shown in FIG. 1. However, the preferred embodiment is one in which the angles of incidence of the waveguide on the trench are in the range of 45° to 60°.

While not shown in the top view of FIG. 3, the interface between the waveguide substrate 52 and each fiber array substrate 54, 56, 58 and 60 can be intentionally tilted at an angle, such as eight degrees. This intentional tilt is intended to decrease the magnitude of reflection between waveguides on substrate 52 and optical fibers on substrates 54, 56, 58 and 60.

In FIG. 3, the waveguide substrate 52 includes sixteen input/output waveguides 62, 64, 66, 68, 70, 72, 74, 76, 78, 80, 82, 84, 86, 88, 90 and 92. Additionally, there are twenty-four intermediate waveguides to increase the flexibility of the switching arrangement. Typically, the operations of the switching matrix that are of greatest concern are the operations that determine the optical coupling of the waveguides 62–68 with the waveguides 86–92. The remaining waveguides 70–84 may be used for add and drop operations or to connect to other switches to form a larger scale switching matrix.

Figure 1:
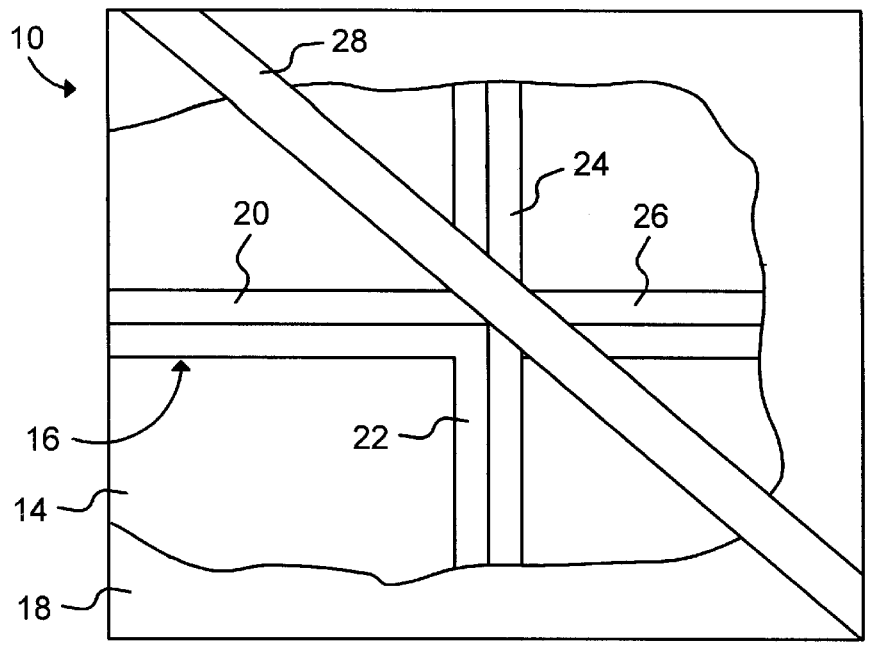
FIG. 1 is a top view of an optical switching element that utilizes total internal reflection in accordance with the prior art.
Figure 2:
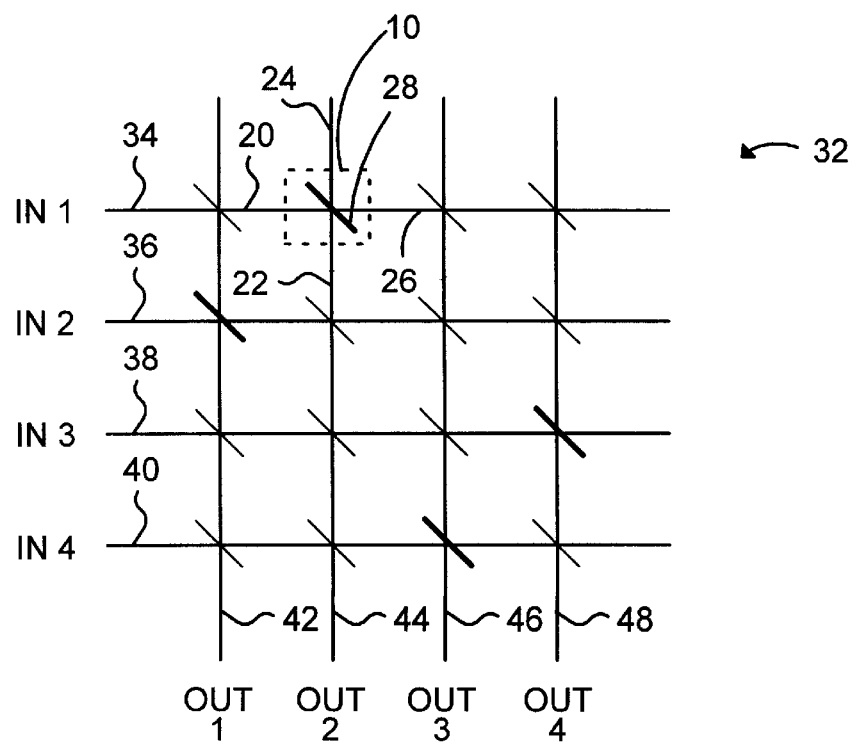
FIG. 2 is a 4×4 matrix of switching elements of FIG. 1 to allow connection of any one of a number of input waveguides to any one of a number of output waveguides in accordance with the prior art.

As previously described with reference to FIG. 1, optical coupling among waveguides is dependent upon the presence or absence of index-matching fluid at the gaps between waveguide ends. If the lowermost trench in FIG. 3 does not include index-matching fluid at the gap, any signals from the waveguide 62 will be diverted by total internal reflection to the waveguide 92. On the other hand, if the gap at the intersection of waveguides 62 and 92 is filled with index-matching fluid, the optical signal from waveguide 62 will propagate through the trench to the next trench. Depending upon the presence or absence of fluid, the input signal from waveguide 62 may be diverted to any of the four waveguides 86–92 or propagate straight through to waveguide 84. This versatility applies to the other three waveguides 64, 66 and 68 that are adjacent to waveguide 62.

Each of the waveguides 62–92 is formed of a core material, such as $SiO_2$ that is doped with Ge or $TiO_2$, to define a first refractive index. Cladding material may be primarily $SiO_2$, but with a different dopant, such as $B_2O_3$ and/or $P_2O_5$, to define a second refractive index different from the first refractive index. Because of the difference in refractive indices, optical signals are guided along the waveguide cores.

Each of the fiber array substrates 54, 56, 58 and 60 includes four optical fibers 96. The pitch of the fibers matches the pitch of the input/output waveguides on the waveguide substrate 52. An acceptable pitch is approximately 250 µm, but other center-to-center distances may be utilized, such as 500 µm. Ideally, the waveguides have the same cross sectional geometry as the optical fibers. However, it is not feasible to fabricate substrate waveguides having a circular cross section. Moreover, the 8 µm dimension of a conventional fiber is not necessarily optimal for waveguides for which optical signals must propagate through fluid-filled trenches in order to pass from one waveguide to a substantially collinear waveguide. It has been determined that transmission losses across fluid-filled gaps are reduced by increasing the cross sectional area of the waveguides. Thus, the waveguides 62–92 may be adiabatically tapered from a relatively large cross sectional area at the interior ends at the trenches 94 to a smaller cross sectional area at the interface with the optical fibers 96. The cross sectional geometry at the interior end is selected to achieve efficient optical coupling across the trenches, while the cross sectional geometry at the exterior ends is selected to achieve high coupling efficiency to the optical fibers. In one embodiment, the adiabatic tapering is from a 16 µm×8 µm cross sectional geometry to an 8 µm square cross sectional geometry. Alternatively, the adiabatic taper may be incorporated along the fibers 96, such as by using a thermally diffused, expanded-core (TEC) fiber. As is known in the art, TEC fibers have an expanding portion at the ends of the fibers.

Figure 4:
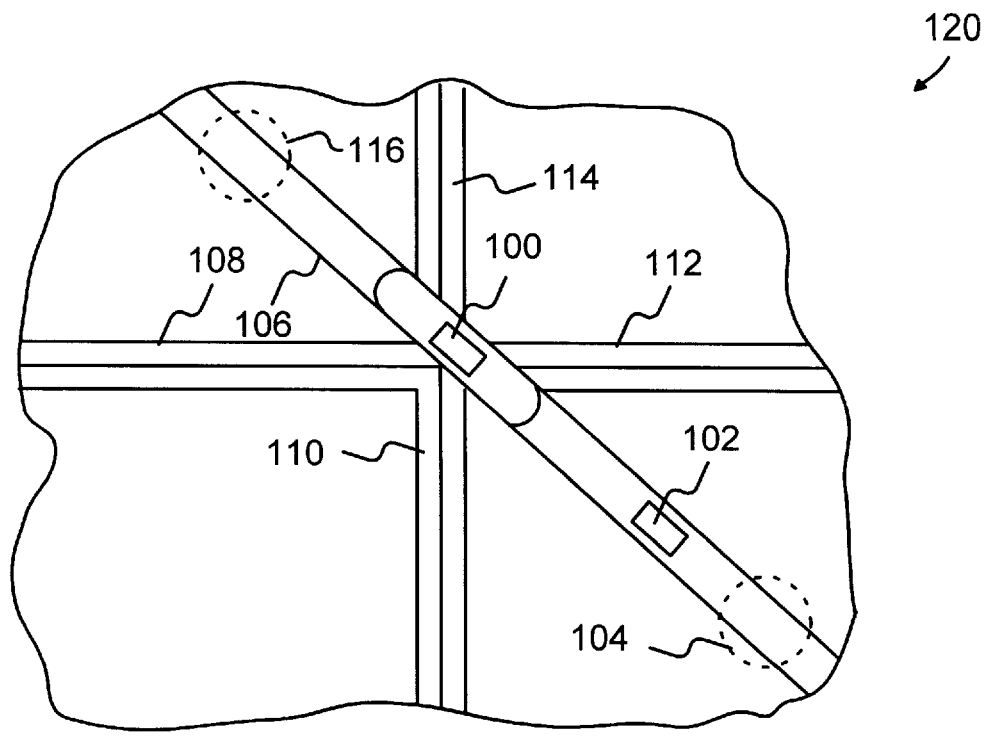
FIG. 4 is a top view of a switching element using bubble manipulation techniques to switch between a reflecting state and a transmitting state and having fluid fill-holes in accordance with the invention. It is currently in a reflecting state.
Figure 5:
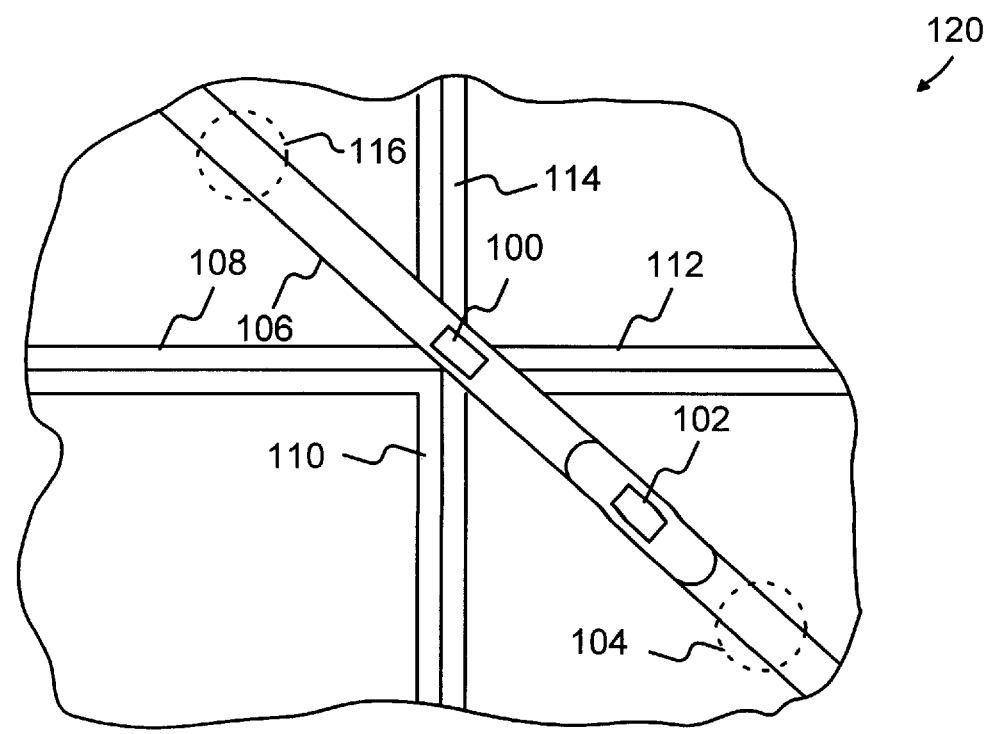
FIG. 5 is a top view of the switching element of FIG. 4 in a transmitting state.

U.S. Pat. No. 5,699,462 to Fouquet et al., which is assigned to the assignee of the present invention and is incorporated herein, describes a number of alternative approaches to switching a switching element between a transmissive state and a reflective state. For each switching element within a matrix, there may be one or more heaters that can be used to create and/or manipulate bubbles within a fluid in order to switch the state of the element. One approach is illustrated in FIGS. 4 and 5. Within this approach, there are two micro heaters 100 and 102 that control the position of a bubble 104 within a fluid-containing trench 106. The fluid within the trench has a refractive index that substantially matches the refractive index of the core material of four waveguides 108, 110, 112 and 114. An acceptable liquid is a combination of isopropyl alcohol and glycerol. Other acceptable liquids are cyclohexane, methylcyclohexane, and M-pyrol.

At the opposite end of the gap that is aligned with the micro heater 100 are fluid fill-holes 116 and 118. The fluid fill-holes are preferably larger than the width of the trench 106 in order to provide a low resistance flow. However, the fluid fill-holes must fit between closely spaced waveguides and leave sufficient space for patterning conductive leads that connect the heaters 100 and 102 to heater drive circuitry. A fluid fill-hole diameter may be within the range of 70 µm to 100 µm, but this is not critical.

In the operation of the switching element 120 of FIGS. 4 and 5, one of the heaters 100 and 102 is brought to a temperature sufficiently high to form a gas bubble. Once formed, the bubble 104 can be maintained in position with a reduced current to the heater. In FIG. 4, the bubble is located at the gap of the four waveguides 108–114. Consequently, an input signal along waveguide 108 will encounter a refractive index mismatch upon reaching the trench 106. Thus, the switching element is in a reflecting state in FIG. 4. The activation of the heater 100 pins the bubble at the gap, so that the reflecting state is maintained as long as the heater is activated.

In FIG. 5, the heater 100 at the gap between the ends of the waveguides 108–114 has been deactivated and the second heater 102 has been activated. The bubble 104 is attracted to the activated heater. This allows index-matching fluid to fill the gap at the intersection of the waveguides. The switching element 120 is in a transmitting state, since the input waveguide 108 is optically coupled to the collinear waveguide 112, and the input waveguide 114 is coupled to the collinear waveguide 110 without crosstalk between the two waveguide paths.

One embodiment of a fabrication method for forming switching elements in accordance with the invention will be described with reference to FIGS. 6–16. In this embodiment, the fluid fill-holes are formed from the back surface of the heater substrate, with the back surface being defined as the surface that does not include the heaters. An alternative embodiment in which the fluid fill-holes are formed from the heater surface to the back surface will be described below, with reference to FIGS. 17–29.

Figure 6:
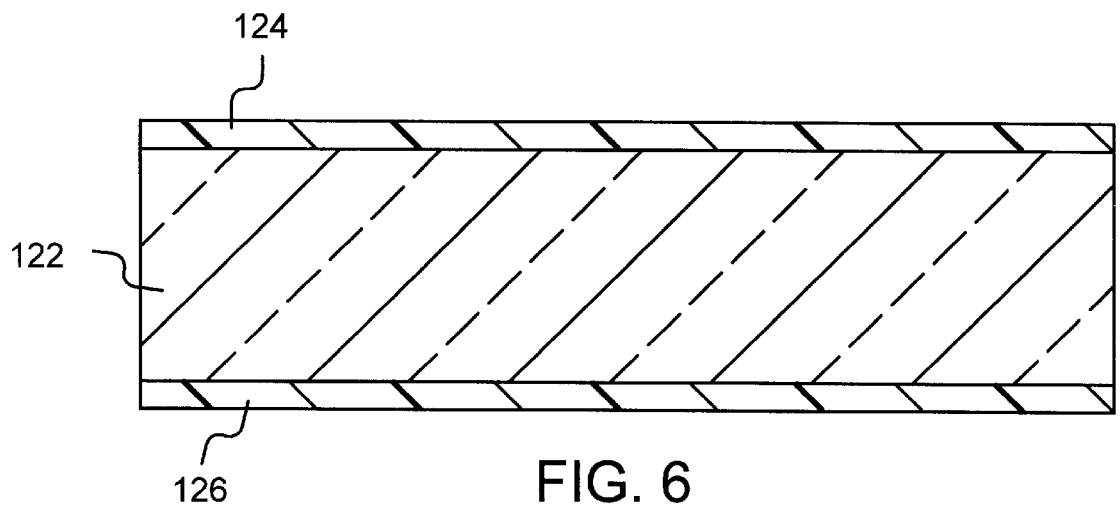
FIGS. 6–16 are side sectional views that illustrate the fabrication of a switching element in accordance with a first embodiment of the invention.

With reference to FIG. 6, a first step is to provide a heater substrate 122. As previously noted, the heater substrate is preferably formed of a material that facilitates use of conventional inkjet and integrated circuit fabrication techniques. A preferred material is silicon, but this is not critical. In FIG. 6, the opposed major surfaces of the substrate 122 have a thermal oxidation layer 124 and 126. As will be explained more fully below, each of the thermal oxidation layers plays a significant role in the patterning of the fluid fill-holes, as well as other functions. A preferred material is $SiO_2$, but other materials may be used. Also in the preferred embodiment, the heater substrate 122 is double-side polished prior to formation of the thermal oxidation layers 124 and 126.

Figure 7:
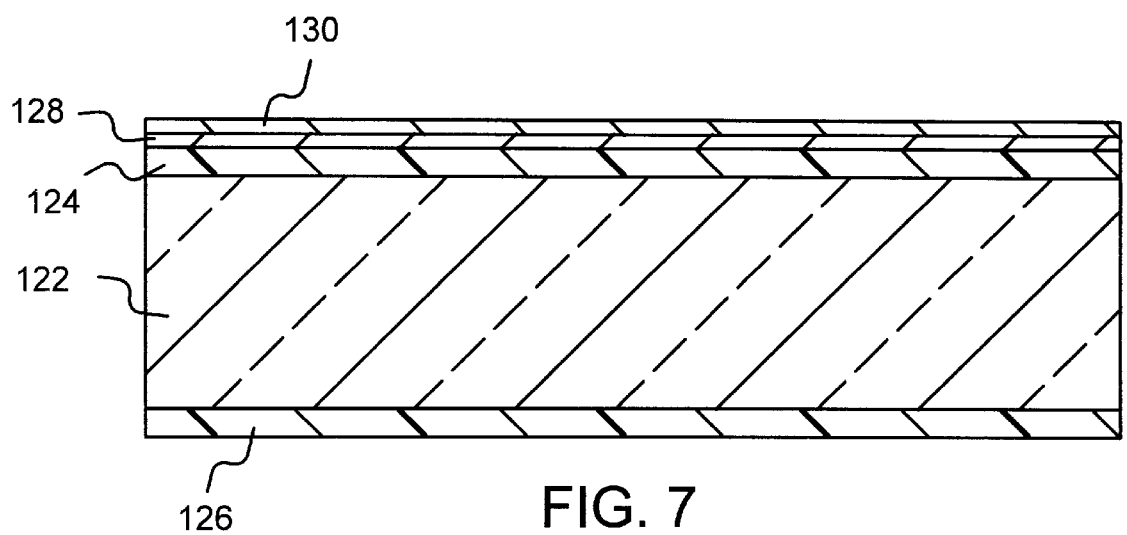

In FIG. 7, two conductive layers 128 and 130 have been formed on the heater surface of the heater substrate 122. Acceptable materials are a lower layer 128 of $Ta_2N$ and an upper layer 130 of Au. The lower layer functions primarily as a resistive material for defining the heaters, while the upper layer is highly conductive and is patterned to define leads for connecting the heaters to heater drive circuitry. Other acceptable materials for forming the heaters include TaAl, W and polysilicon.

Figure 8:
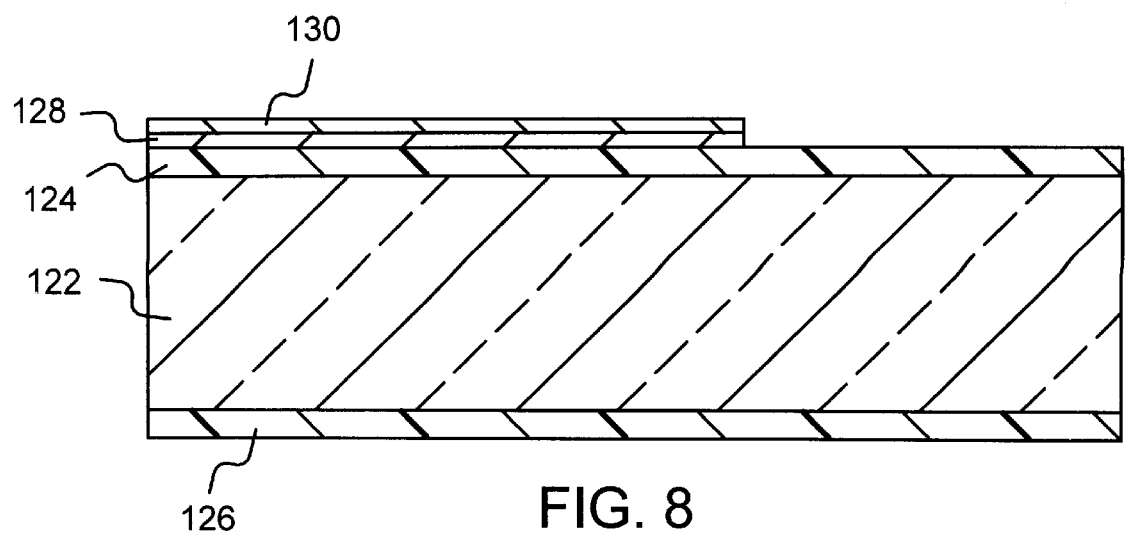
Figure 9:
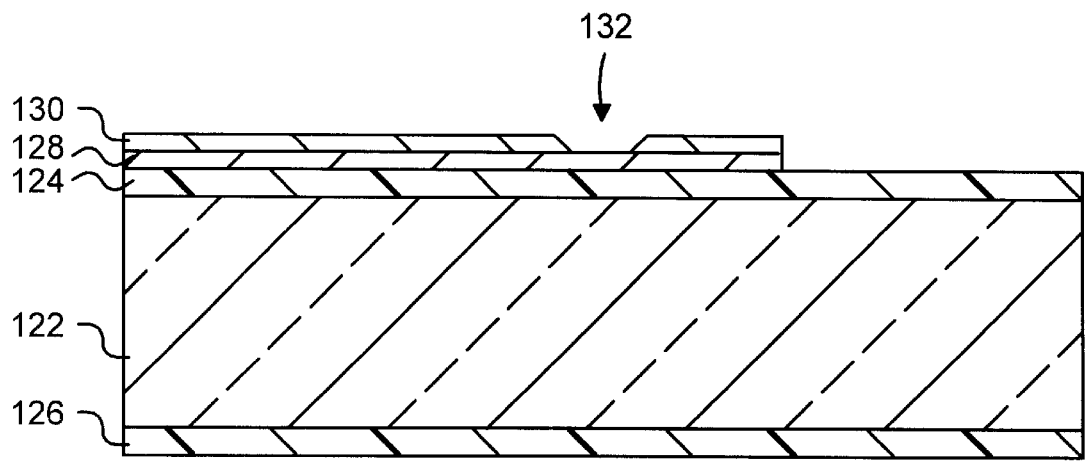

In FIG. 8, the two conductive layers 128 and 130 have been uniformly patterned to define a lead. The patterning may be accomplished using conventional photolithographic techniques. In FIG. 9, the highly conductive upper layer 130 has been patterned to expose a region 132 of the more resistive lower layer 128. This exposed region is the heater region that generates thermal energy when electrical current is caused to conduct through the region from the patterned upper conductive layer 130.

Figure 10:
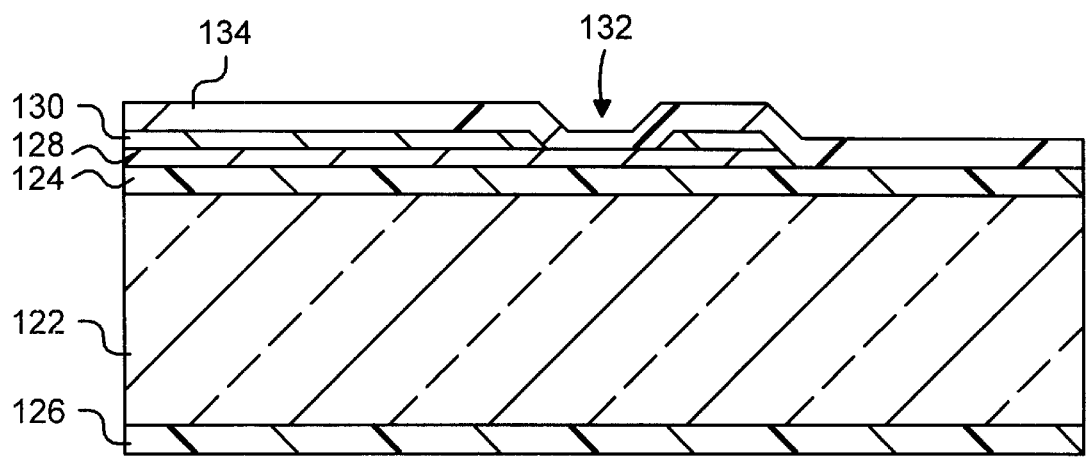
Figure 11:
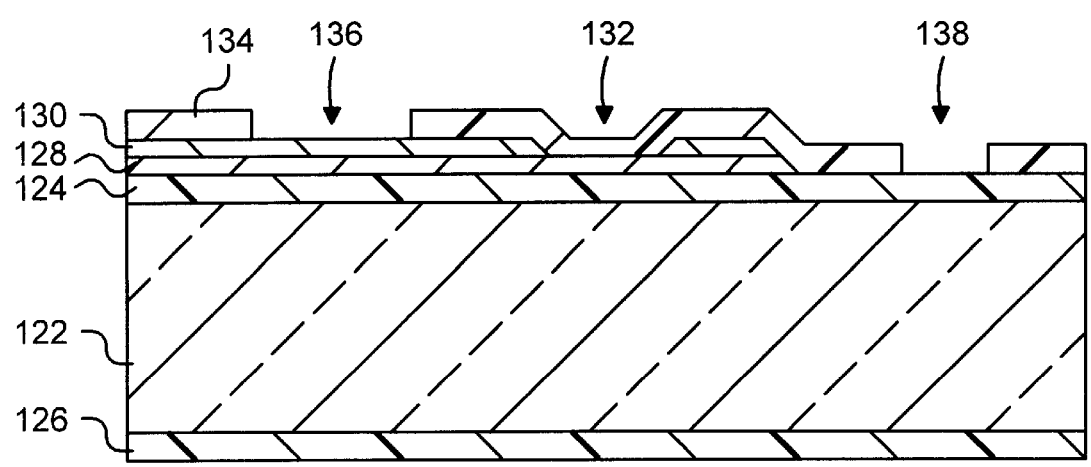

Referring now to FIG. 10, a passivation layer 134 is formed on the heater surface of the heater substrate 122. The passivation layer provides electrical isolation of the two conductive layers 128 and 130 from the index-matching liquid during operation of a switching element. The passivation layer may be $SiC_x$, $SiC_x+Si_xN_y$, $Si_xN_y$, or a similar material. In FIG. 11, the passivation layer has been patterned to expose a surface region 136 of the conductive layer 130. This surface region 136 provides a bond pad for subsequent connection to the heater drive circuitry that is used in operating the heater at region 132. The patterning of the passivation layer 134 also exposes a region 138 at which a fluid fill-hole will be formed.

Figure 12:
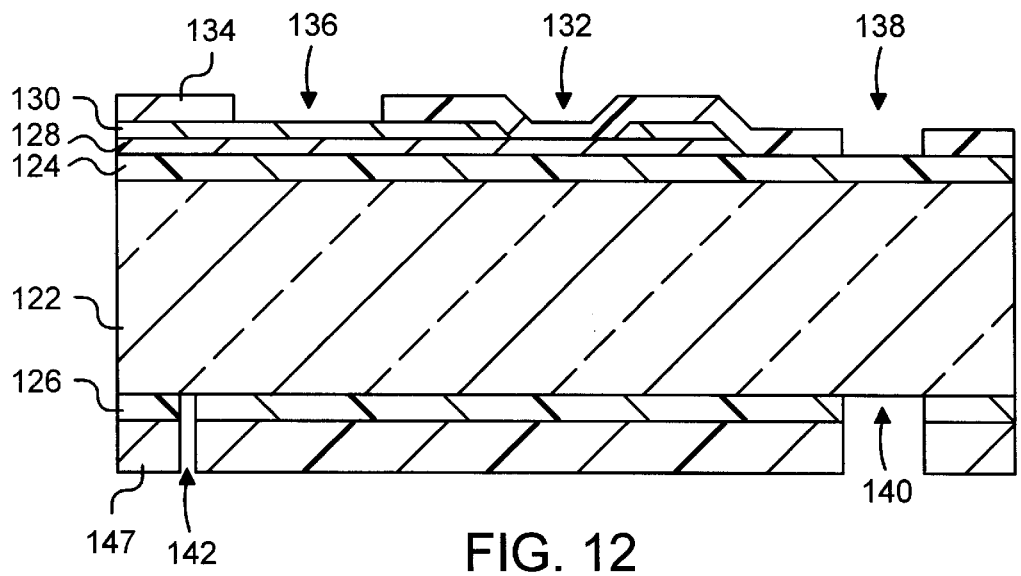

In FIG. 12, the back side of the heater substrate 122 has been spun with a thick photoresist 147. The photoresist and the thermal oxidation layer 126 have been patterned to expose a first region 140 that is aligned with the region 138 and to expose a second region 142. The exposed region 140 provides a means for forming the fluid fill-hole. The region 142 provides a means for forming one of a series of holes and/or a narrow continuous slot to structurally weaken the edge portion of the substrate. That is, the series of holes (or the narrow slot) provides perforations for subsequently removing the left edge of the substrate, as viewed in FIG. 12.

The fluid fill-holes are formed in a direction perpendicular to the major surfaces of the heater substrate 122. Thus, the supply of the index-matching fluid does not significantly interfere with the thin film electrical connections to the heater region 132. However, it is somewhat more problematic to form the fluid passages through the heater substrate, than it is to form fluid trenches along the surface of a substrate. Conventional wet etching techniques may not be used in many applications, since the waveguides are only 250 µm apart and standard four-inch commercial silicon wafers (i.e., 100 mm wafers) are on the order of 500 µm thick. Because the slope of side walls formed using conventional wet etching is approximately 55°, the fluid fill-holes would merge horizontally before vertical etching is completed. Using thinner wafers to decrease the vertical etch dimension is possible, but the thinner wafers are more difficult to handle and more susceptible to breakage.

Three drilling techniques for forming the fluid fill-holes were considered. Sand drilling is an option, but there is an extreme difficulty of fabricating the necessary metal "drill bit," a part with a very narrow-diameter hole with a 50:1 aspect ratio, to focus the sand spray. Another option was to use laser drilling to fabricate the fluid fill-holes, but the heat generated by the process can melt the thin film circuitry on the heater surface of the wafer, if the thin film circuitry is within a few hundred micron radius of the laser-drilled hole. Thus, laser drilling is not possible in some applications of the invention. The technique that is suitable is referred to as inductively coupled plasma (ICP) reactive ion etching (RIE). This technique is utilized in the fabrication of micro electromechanical systems (MEMS) on semiconductor wafers. A problem with the sand drilling and laser drilling techniques is that the drilling processes are relatively slow, since each fluid fill-hole must be drilled individually.

There are a number of factors that are interrelated in the selection of techniques for implementing the steps that are illustrated in FIGS. 13–16. Merely forming the fluid fill-holes and the perforations is not sufficient. It is also necessary for large-scale manufacturing to provide an adhesive layer for bonding the heater and waveguide substrates together, in addition to fabricating the fluid fill-holes. Implementing hole fabrication technologies may degrade the quality of the adhesive layer and/or the flatness of the adhesive layer, if executed after the adhesive layer is applied. Moreover, switches may be damaged if the holes are formed after the waveguide chip is bonded to the heater substrate. Roller-coating the adhesive layer onto the surface of the heater substrate 122 is an option, but the result is typically less uniform than a spin-coated layer. On the other hand, the presence of the fluid fill-holes renders it difficult to obtain a uniform coating by spinning. In the embodiment of FIGS. 12–16, the problem is overcome by using the thermal oxidation layer 124 as an etch-stop layer.

Figure 13:
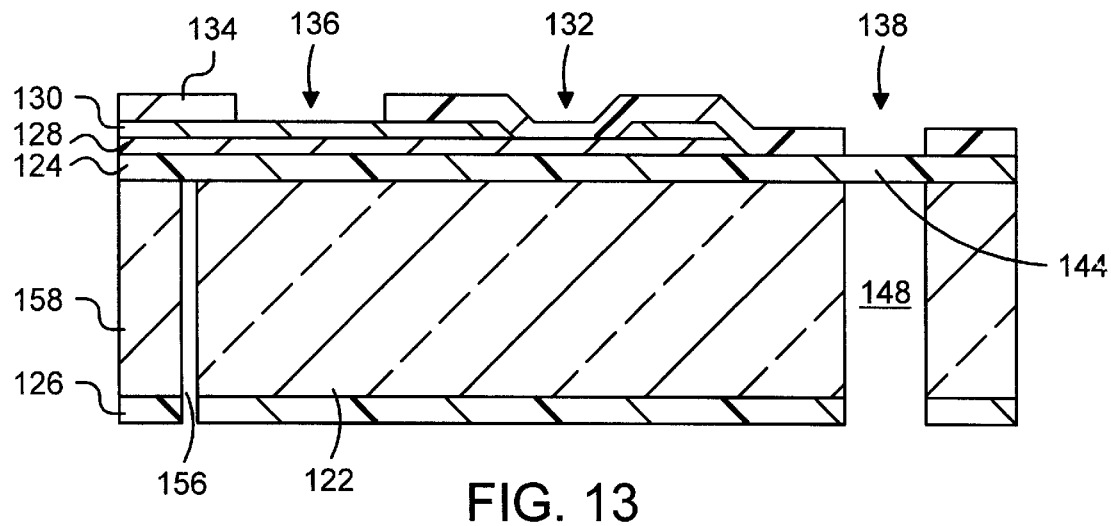
Figure 14:
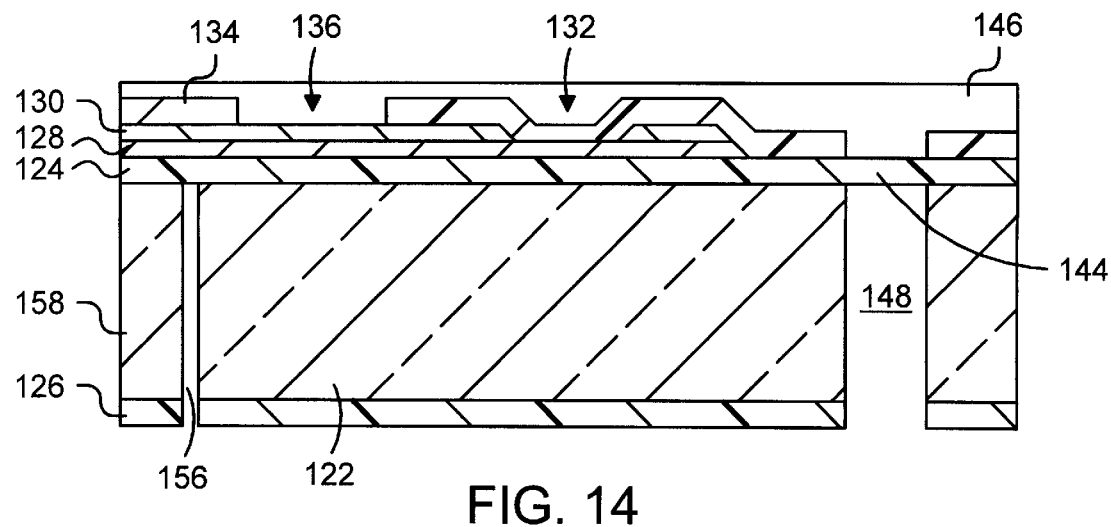

Thus, the thermal oxidation layer 124 on the heater surface of the heater substrate 122 serves a number of functions. The thermal oxidation layer acts as a heat barrier in isolating the heater at region 132 from the substrate material. Moreover, the ICP RIE process is highly selective with respect to etching silicon over silicon dioxide. If the thermal oxidation layer 124 is $SiO_2$, the vertical etch will terminate upon reaching the thermal oxidation layer 124. Referring to FIG. 13, the photoresist has been removed from the back-side $SiO_2$ layer 126, but a membrane 144 of the front-side $SiO_2$ layer 124 remains to support the adhesive layer 146 that is applied as shown in FIG. 14. Leaving an $SiO_2$ layer intact has the additional advantage of maintaining separation between the reactive gases that are used to etch the exposed face of the semiconductor substrate 122 and the gas cooling (such as helium) in contact with the opposite face, i.e., the heater surface of the wafer. With a process that would open holes all the way through the wafer, the cooling gas would leak into the main etching chamber. Gas cooling has advantages over liquid cooling, and the substrate must be cooled during a long etch in order to preserve the side wall quality.

In FIG. 14, the adhesive layer 146 is applied. While other materials may be used, the adhesive layer may be a photo-imageable polymer, such as a photoimageable benzocyclobutene (photo-BCB). The adhesive layer 146 is applied to the upper surface of the heater substrate 122 using a spin-on process. Since a thin adhesive layer (e.g., less than or equal to 5 µm) is preferred, liquid adhesive appropriate for spin-on application is preferable to the thicker dry film adhesives (12–50 µm) that are standard in many inkjet fabrication processes. It is not preferable to spin the adhesive layer on the waveguide substrate for four reasons: (1) the optically reflecting interface may be contaminated by applying the adhesive layer onto the interface; (2) the waveguides are often purchased from a vendor after being sawed from a wafer form to a chip form, and it would require tedious and less reproducible adhesive application if the layer were applied to many small parts; (3) the waveguide structures are more expensive than the heater structures, and consequently should not be used for a process development which has a less than optimal yield; and (4) the spun film will be more uniform over the heater wafer, due to its smaller variations in topology.

Figure 15:
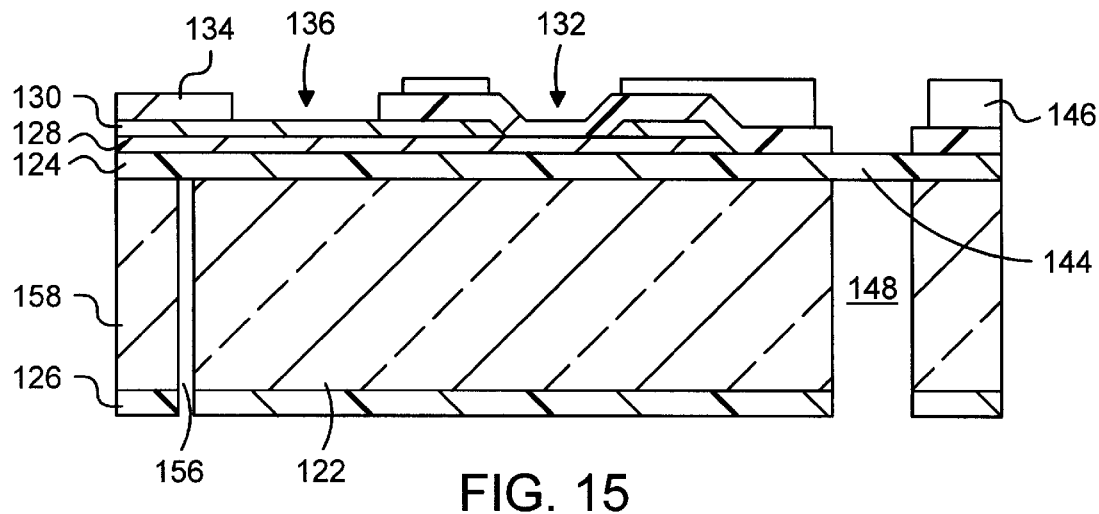
Figure 16:
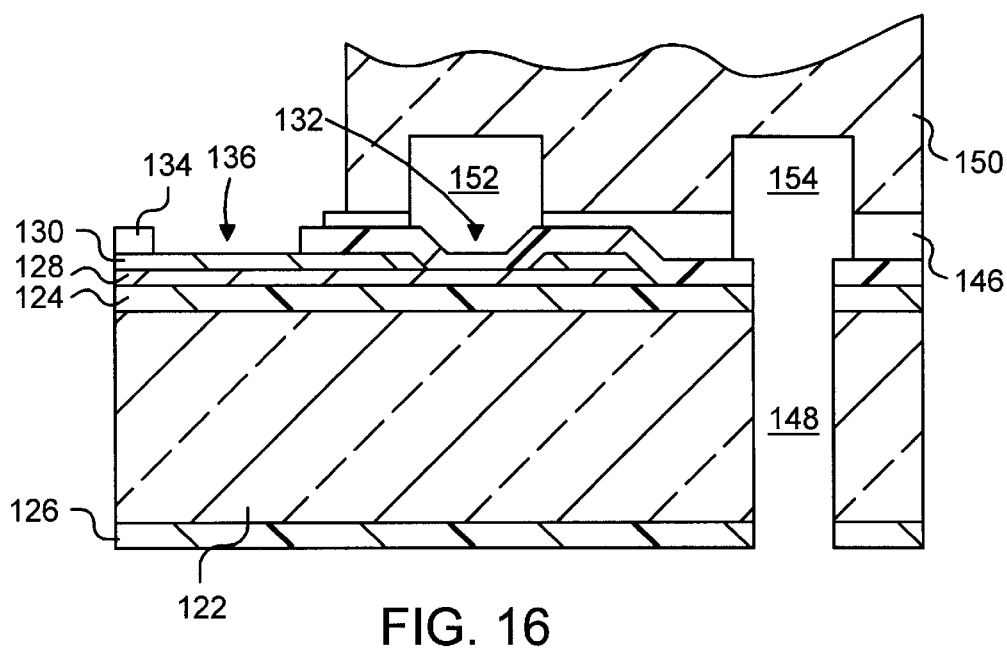

Still referring to FIG. 14, after the ICP RIE step is completed, the adhesive layer 146 is spun onto the front surface of the heater substrate 122, including the thermal oxidation membranes 144 over the fluid fill-holes 148. In FIG. 15, the adhesive layer 146 is patterned to once again expose the bond pad 136, the heater region 132 and the region 138 that is aligned with the fluid fill-hole 148. The membrane 144 can then be easily removed by rupturing with pressure from a gas gun or by using a conventional etch step. The resulting structure is shown in FIG. 16, with a waveguide substrate 150 bonded to the heater substrate 122. While FIG. 16 is not intended to be a drawing that is drawn to scale, and while the embodiments of FIGS. 3 and 16 are not completely compatible, it is instructive to correlate FIGS. 3 and 16. The heater substrate 122 and the waveguide substrate 150 of FIG. 16 compare to the heater substrate 53 and the waveguide substrate 52 of FIG. 3. The bond pad 136 may be the center bond pad 55 in the lowermost array of bond pads 55 in FIG. 3. Thus, the bond pads 136 and 55 are exposed for connection to heater drive circuitry. Along the vertical line from bond pad 55 to the intersection of waveguides 62 and 92 in FIG. 3, the intersection of the axes of these two waveguides 62 and 92 may be the location of the heater region 132 in FIG. 16. That is, the lowermost trench 94 in FIG. 3 is similar to the position of the a trench 152 that is aligned with the heater region 132 in FIG. 16.

Again referring to a vertical line extending upwardly from the intersection of the waveguides 62 and 92 in FIG. 3, the next feature of the switching matrix 50 of FIG. 3 is the intersection of a center fluid fill-hole of the trench 94 above the lowermost trench. This fill-hole compares to the fluid fill-hole 148 of FIG. 16 and the trench 94 compares to the trench 154 of FIG. 16. The remainder of the vertical cross section through the switching matrix 50 is not shown in FIG. 16.

For ease of fabrication, it is desirable to avoid further sawing of the waveguide substrates after they have been diced. However, the substrate itself must be even with or recessed behind the edges of the waveguides 62–92 of FIG. 3, so that the optical fibers 96 can be efficiently coupled to the waveguides to obtain low insertion loss. The difficulty is that the distance from the center of the waveguides to the upper cladding of the waveguides is only 25 μm, while the distance from the center of an optical fiber to the outside of the cladding is 62.5 μm. Thus, the fiber may hit the heater substrate 53 before reaching the edge of the waveguide. In order to provide a recess without sawing the waveguide substrate, waveguide chips may be bonded to heater chips after sawing the heater chips (since the saw path is a straight line). Alternatively, "knockout" edge portions of the heater chips may be removed after the bonding of the waveguide chips to a wafer array of heater chips. While bonding chip-to-chip is possible, it is less desirable than the second alternative, since (1) it requires individual die-to-die alignment, rather than die-to-wafer alignment, (2) it requires protection of any spun-on adhesive during sawing of the heater wafer, and (3) it is inherently more expensive. Thus, the "knockout" approach allows for less expensive large-area alignment. As a third alternative, the wafer can be sawed into strips of heater chips before the bonding process, thereby reducing the amount of thermal cycling any given device must undergo during the bonding of neighboring devices.

Returning to FIG. 12, the region 142 of the back surface of the heater substrate 122 that is exposed by patterning the back side thermal oxidation layer 126 may be used to define a structurally weakened edge portion of the heater substrate. While not shown in FIG. 12, the region 142 is only one within a series of such regions. During the ICP RIE step, the substrate material is etched to form a series of holes, such as the hole 156 shown in FIG. 13. The holes 156 have smaller lateral dimensions than the fluid fill-holes 148, and are aligned to define the structurally weakened edge portion 158 of the substrate 122. The series of holes (or slot) forms a perforation or "dotted-line" along the edge portion 158. While not shown in FIG. 13, the hole 156 preferably does not extend through the entirety of the substrate material 122. However, the perforations may extend through the entirety of the substrate material, as long as sections of the wafer beyond these perforations remain intact to prevent wafer breakage. It is possible to etch the perforations (or slot) while completing the etching of the fluid fill-hole 148, since the narrower perforations etch at a slower rate than the larger fluid fill-holes.

Referring now to FIG. 16, after the steps of bonding the waveguide substrate 150 to the wafer that includes the heater substrate shown in FIG. 16, the heater substrate is sawed into discrete die. The structurally weakened edge portion 158 of FIG. 15 is then broken along the perforations formed by the series of holes 156. The removal of the structurally weakened edge portion 158 provides access of optical fibers to the waveguides on the waveguide substrate 150. For purposes of illustration, a dashed line 159 in FIG. 3 has been included to indicate the edge portion that was removed from the bottom heater substrate 53 to accommodate access of the fibers 96 on substrate 60 for coupling to waveguides 62–68.

In the formation of the structurally weakened edge portion 158, the wafer mask for defining the regions 142 of FIG. 12 should be designed so that there are no connecting holes between different devices, thereby reducing the likelihood that an accidental cleave of the wafer will occur along the line defined by the perforations. Otherwise, the wafer remains structurally intact and does not break along the perforations during the dicing operation.

Figure 17:
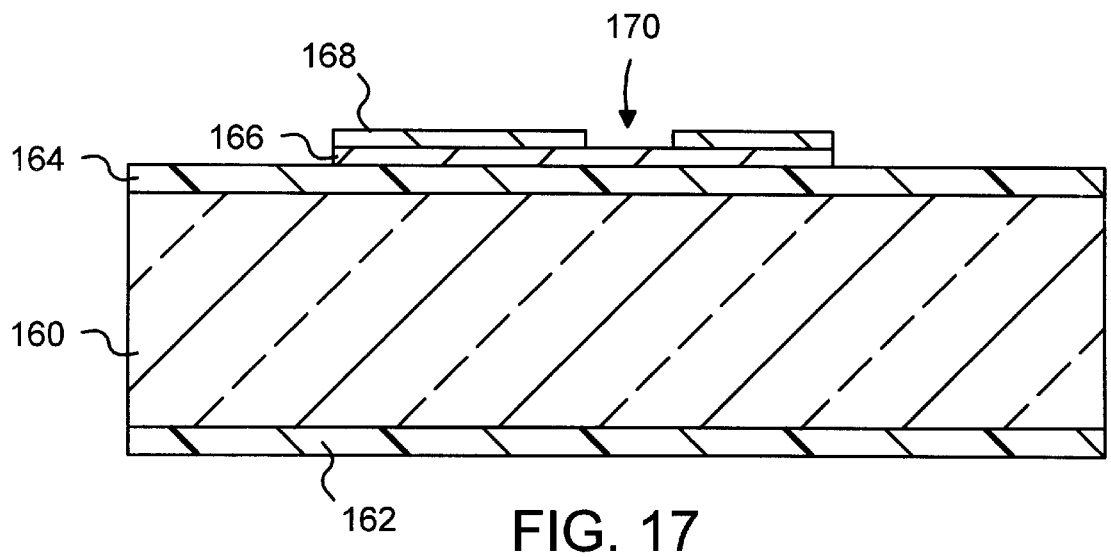
FIGS. 17–29 are side sectional views that illustrate a second embodiment of fabricating a switching element.

Again referring to FIG. 13, a concern with the execution of the ICP RIE step is that the strong selectivity of etching the substrate material 122 to the $SiO_2$ thermal oxidation layer 124 may cause lateral etching once the fluid fill-hole 148 reaches the thermal oxidation layer 124. The lateral etching could adversely affect the operation of the switching element. FIGS. 17–29 illustrate an alternative embodiment to the fabrication of a switching element. In the method according to FIGS. 17–29, the fluid fill-holes and the 35 holes that define the structurally weakened edge portion of the heater substrate are formed from the heater surface toward the back surface of the substrate. Referring to FIG. 17, thermal oxidation layers 162 and 164 are formed on opposite major surfaces of a wafer 160, such as a silicon wafer. The process and the considerations are identical to those described with reference to FIG. 6.

A resistive heater layer 166 and a highly conductive lead layer 168 are formed on the heater surface of the heater substrate 160. The heater and lead layers are patterned using known techniques, such as photolithography. The lead layer 168 is patterned to expose a region 170 of the more resistive heater layer 166, so that current conducting through the lead layer must enter the heater layer at region 170, thereby causing thermal energy to be generated within this region.

Figure 18:
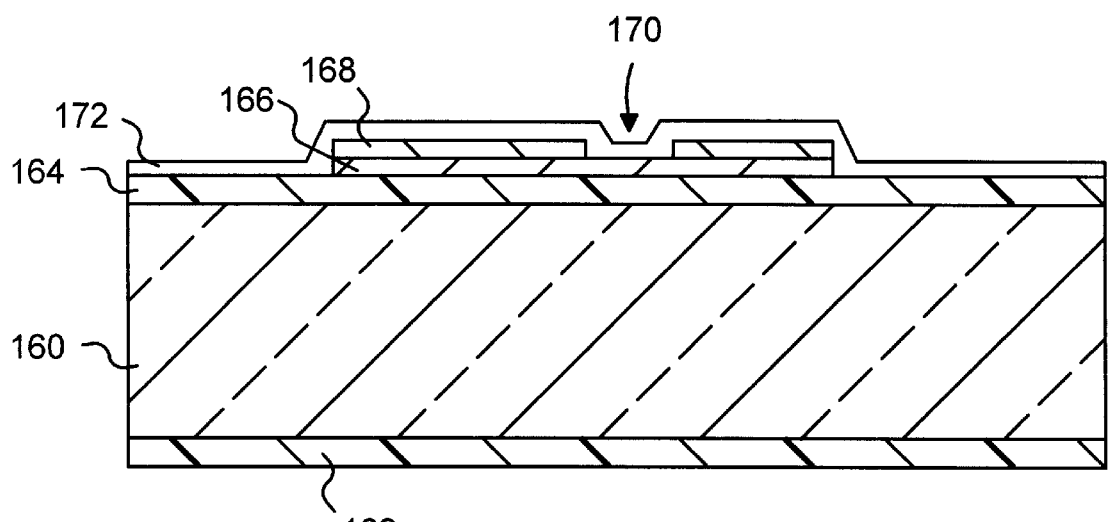

In FIG. 18, a passivation layer 172 has been uniformly deposited across the heater surface of the heater substrate 160. The passivation provides electrical isolation and chemical protection of the two conductive layers 166 and 168 from the index-matching liquid that is used during operation of the switching element. The passivation layer may be $SiC_x$, $SiC_x+Si_xN_y$, $Si_xN_y$, or a similar material.

Figure 19:
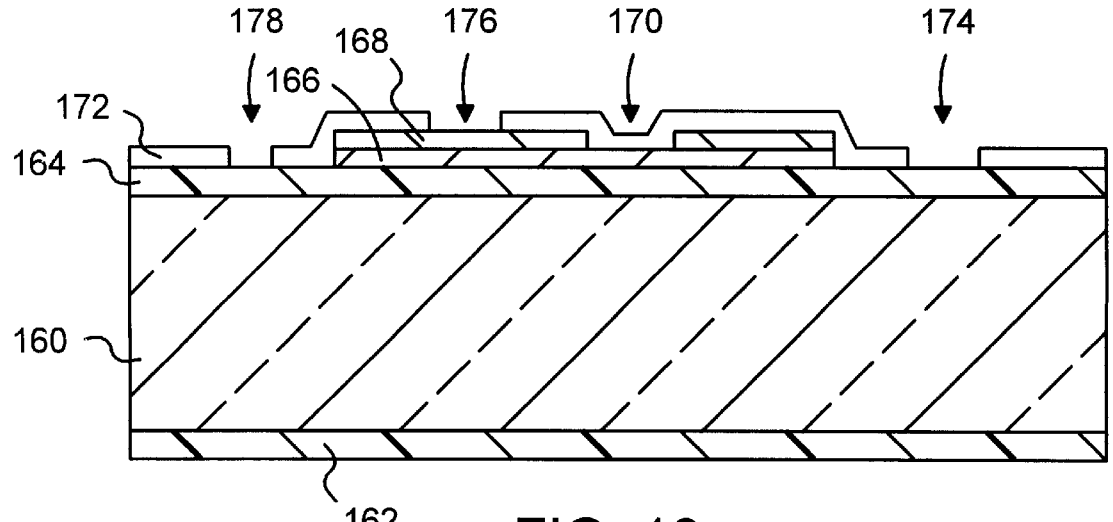

In the step illustrated by FIG. 19, the passivation layer 172 is patterned to expose a region 174 for forming the fluid fill-hole, a region 176 for the bond pad, and a region 178 for forming one of the holes that defines the structurally weakened edge portion of the substrate 160.

Figure 20:
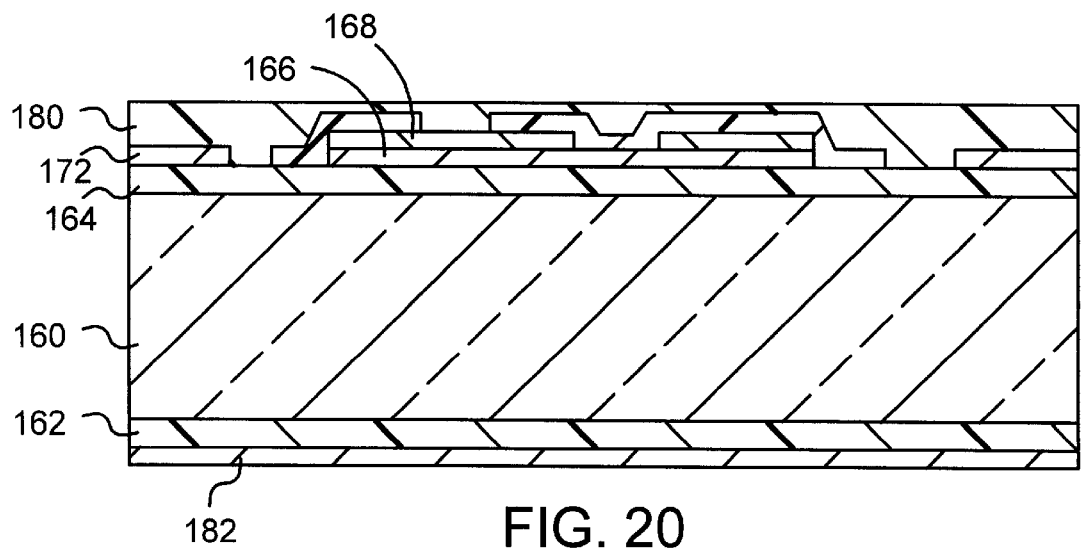
Figure 21:
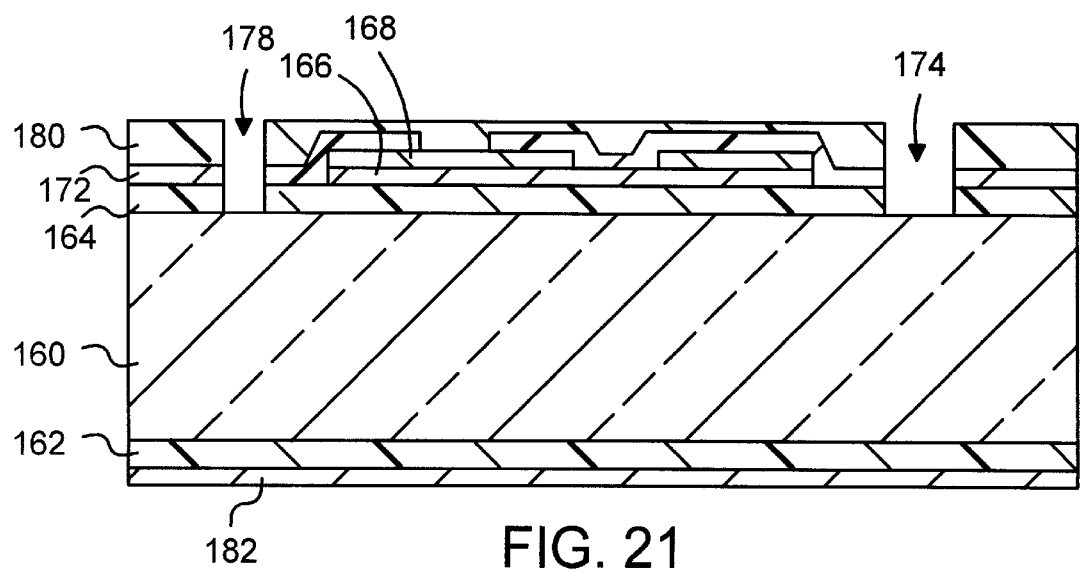
Figure 22:
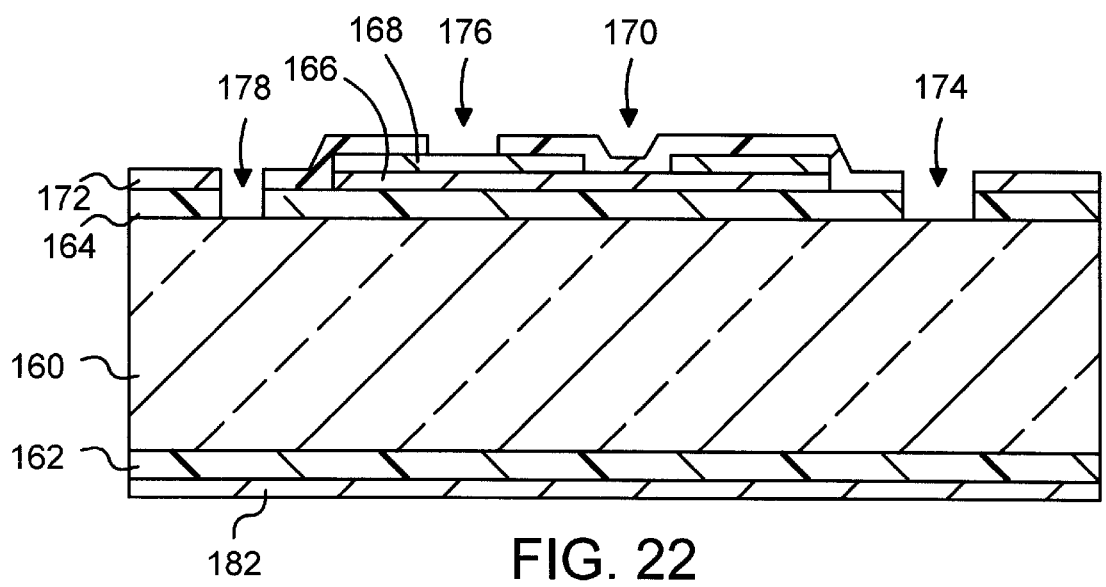

In FIG. 20, double-sided photoresist protection is provided by layers 180 and 182. The top side photoresist layer 180 is used in a photolithographic process to etch the thermal oxidation layer 164, re-exposing the fluid fill-hole region 174 and the perforation hole region 178, as shown in FIG. 21. The front-side photoresist layer 180 is then removed to provide the assembly shown in FIG. 22.

Figure 23:
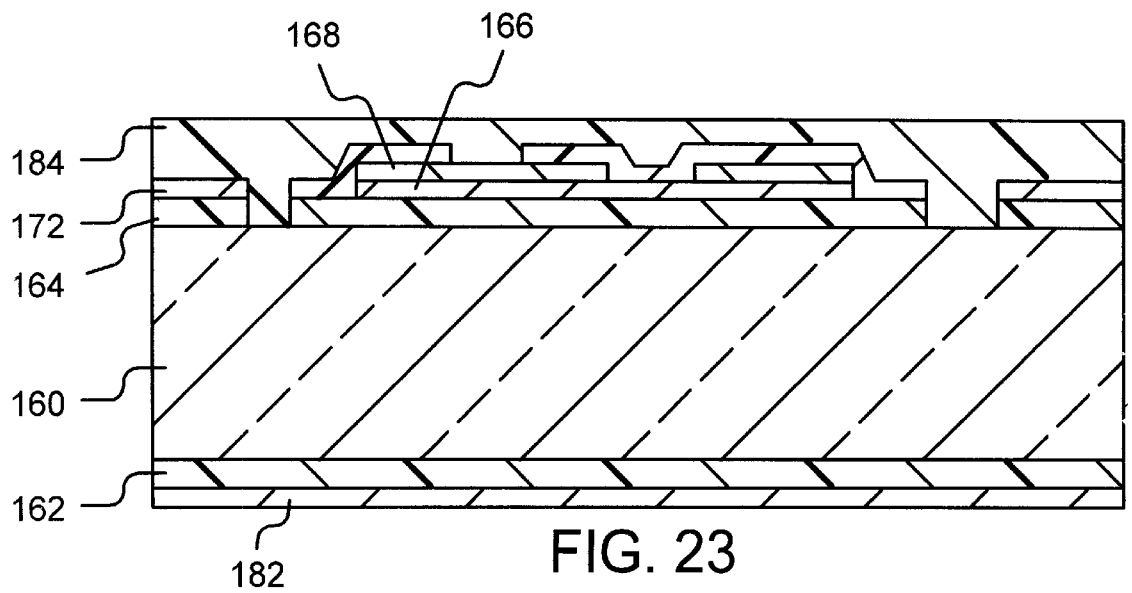
Figure 24:
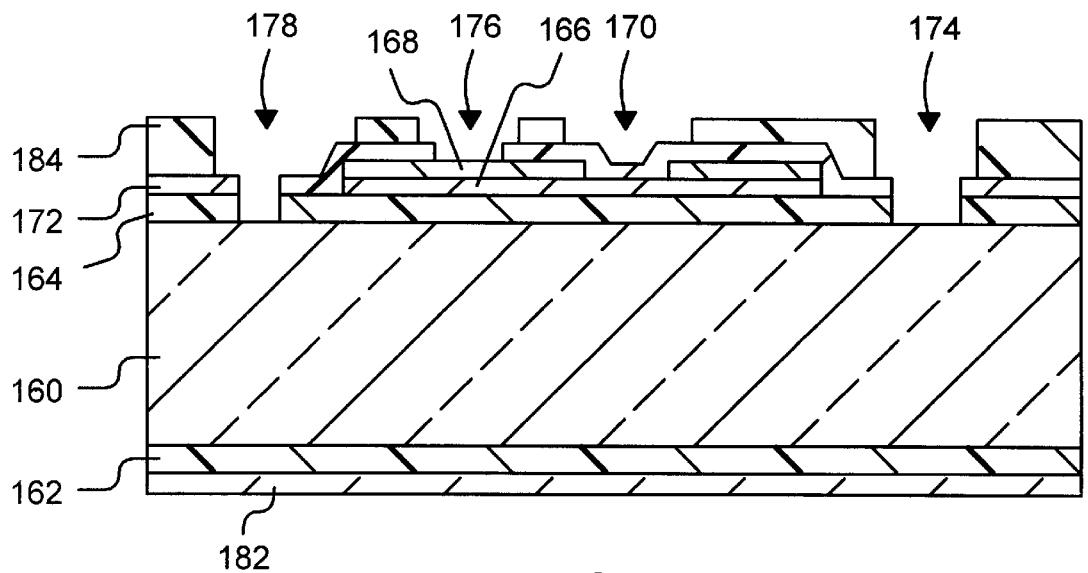
Figure 25:
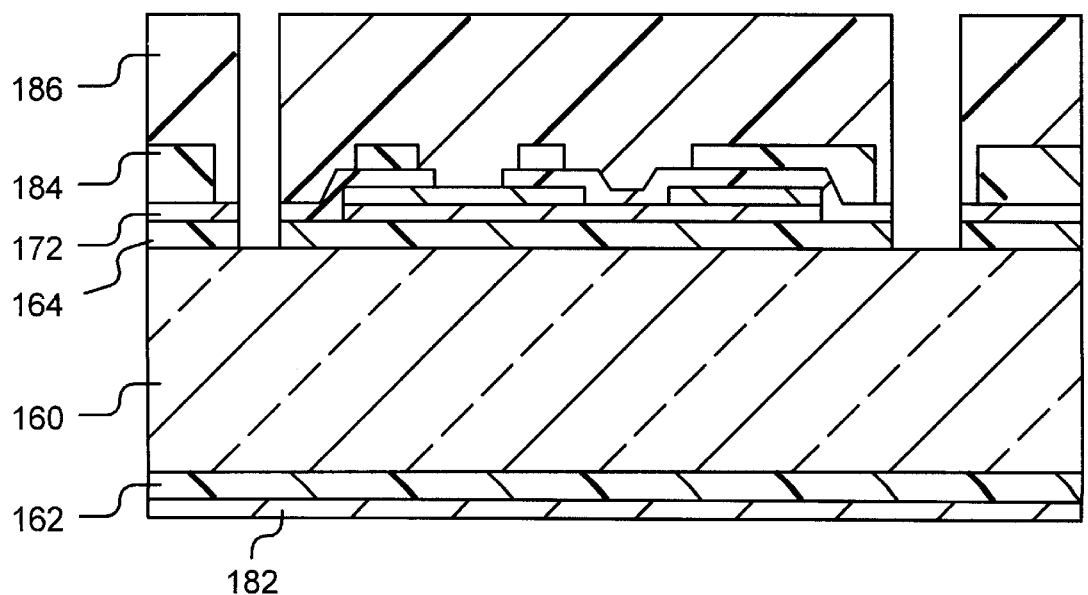

In FIG. 23, an adhesive layer 184 is applied to the heater surface of the heater substrate 160. Preferably, the adhesive layer is a spin-coated layer of a photoimageable polymer (e.g., photo-BCB). However, other materials and/or other application techniques may be utilized. In FIG. 24, the adhesive layer is patterned to expose the heater region 170, the fill-hole region 174, the bond pad region 176 and the perforation region 178. Conventional techniques for patterning an adhesive layer may be utilized. Next, a photoresist layer 186 is applied to the heater surface of the substrate 160 to protect the photoimageable polymer during the ICP RIE process for forming the fluid fill-hole and the perforation. The photoresist layer 186 is patterned, as shown in FIG. 25, to expose the regions to be etched during the ICP RIE process.

Figure 26:
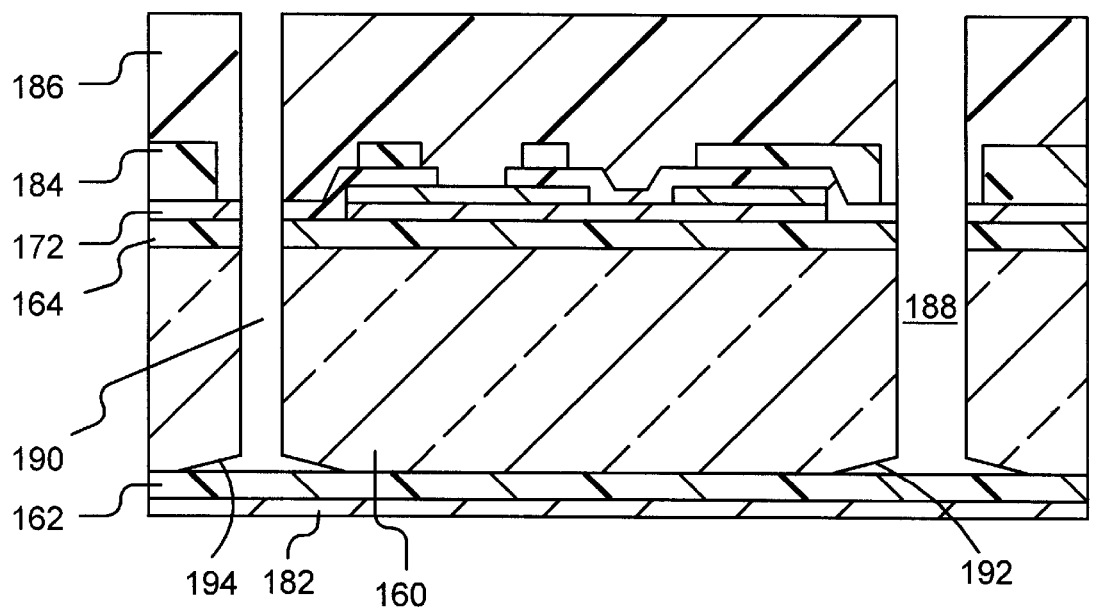

The ICP RIE etch step occurs from the heater surface side of the heater substrate 160 and is therefore somewhat more relaxed than the etch in the opposite direction. Lateral etching of the substrate material upon reaching the thermal oxidation layer may improve performance of the switching element when the lateral etching takes place at the side of the substrate from which the index-matching liquid is supplied. Referring now to FIG. 26, a fluid fill-hole 188 and a perforation 190 are formed during the ICP RIE step. Both of the holes 188 and 190 include expanded ends 192 and 194 as a result of lateral etching when the vertical etch reaches the back-side thermal oxidation layer 162.

Figure 27:
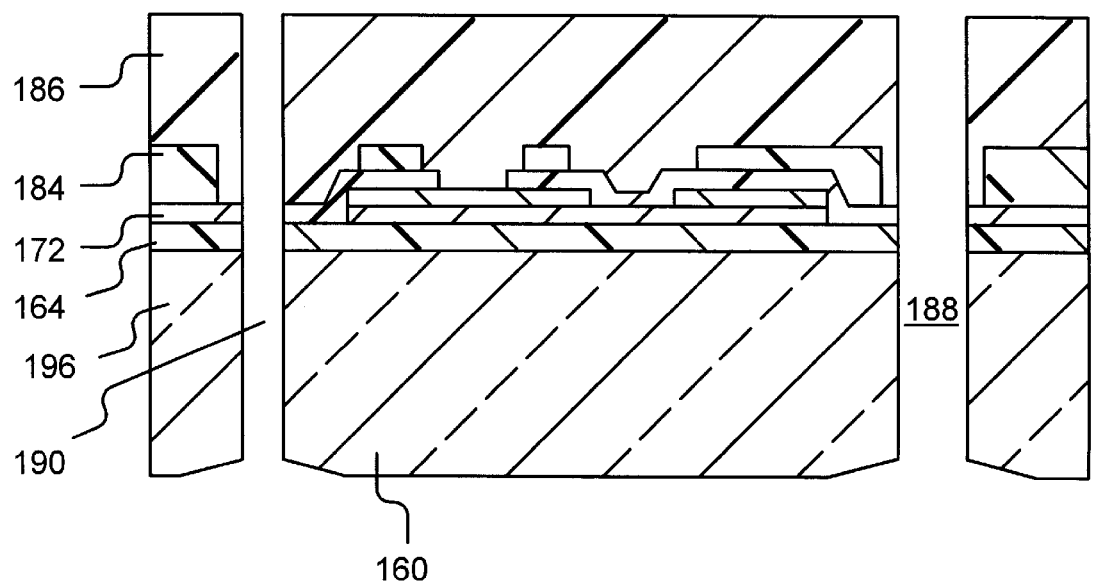
Figure 28:
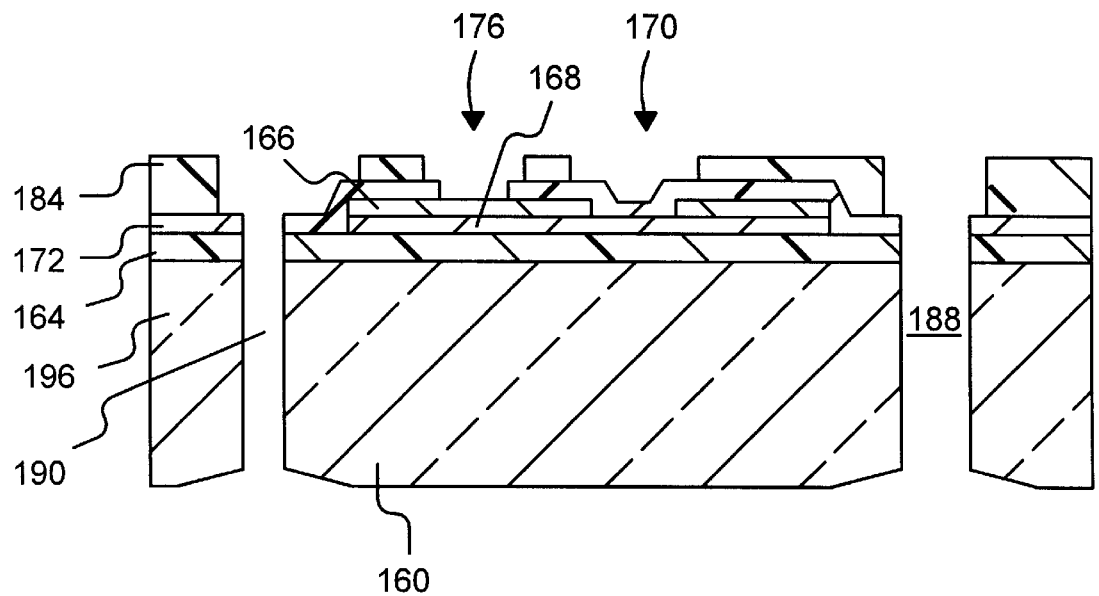

In the next step, the back-side photoresist 182 and thermal oxidation layer 162 are removed to provide the assembly shown in FIG. 27. The perforation that includes the hole 190 defines a structurally weakened edge portion 196. Referring now to FIG. 28, the photoresist layer is then removed to expose the heater region 170 and the bond pad region 176, as well as the patterned adhesive layer 184.

Figure 29:
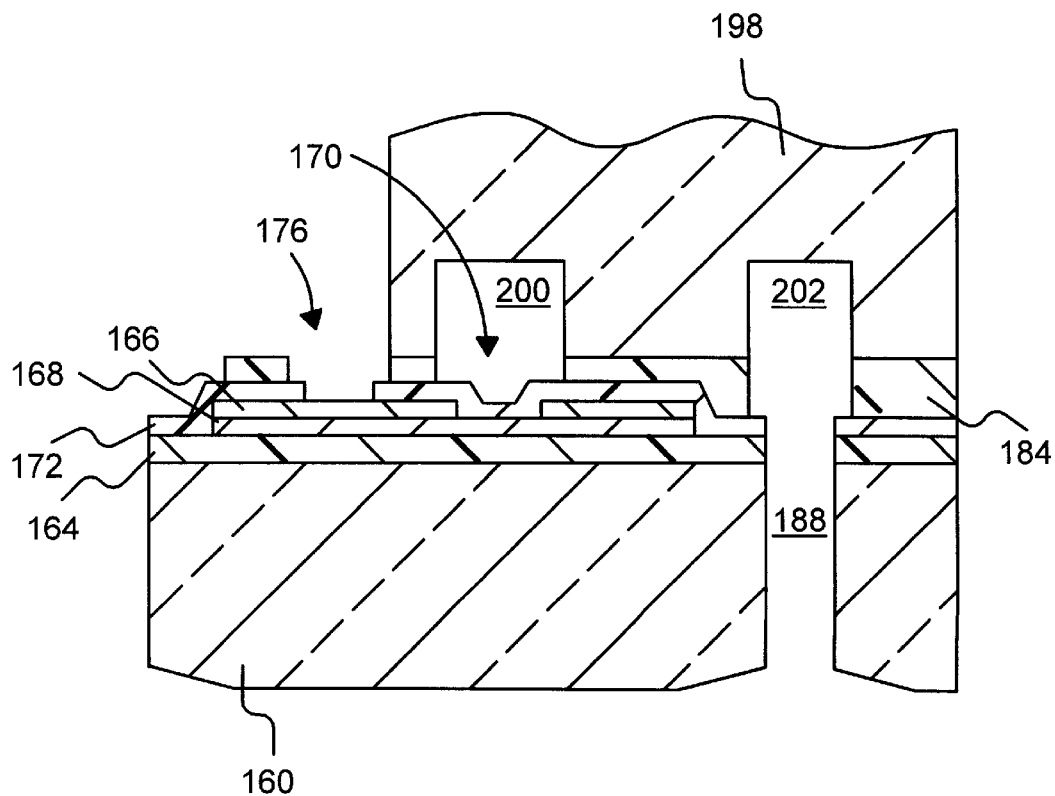

In FIG. 29, a waveguide substrate 198 is bonded to the heater substrate 160 and the photoimageable adhesive layer 184 is cured. The heater region 170 is aligned with a first trench 200 and the fluid fill-hole 188 is aligned with an adjacent trench 202. In a final step, the structurally weakened edge portion, not shown in FIG. 29, is removed to accommodate the optical coupling of waveguides to optical fibers (not shown). The removal of the structurally weakened edge portion preferably occurs after the heater wafer has been diced into a batch of the switching matrixes 50 shown in FIG. 3.

In operation, the fluid fill-holes 57 of FIG. 3 may be connected to a single source of index-matching fluid. An advantage of the design is that the trenches 94 readily fill with fluid when the waveguide chip 52 is atop the heater chip. The switching matrix 50 is tested with the waveguide chip in a position that allows the bubble motion to be viewed with a standard visible-light microscope. If a puddle of index-matching fluid is introduced underneath the matrix 50 from one side, the fluid fill-holes 57 wick up the fluid by capillary action and the trenches are supplied with the fluid from the fill-holes by capillary action. Preferably, the trenches have the smallest cross sectional dimensions within the fluid supply path, so that capillary action provides a reliable fluid supply.

What is claimed is:

1. A method of fabricating a switching element in which fluid is manipulated so as to toggle said switching element between a transmissive state and a reflective state, said method comprising the steps of:
    providing a substrate; and
    utilizing inductively coupled plasma (ICP) reactive ion etching (RIE) to selectively remove material from said substrate.

2. The method of claim 1 wherein said step of providing said substrate includes providing one of a waveguide substrate for a pattern of optical waveguides and a heater substrate for a pattern of thermal heaters to selectively manipulate said fluid.

3. The method of claim 1 wherein said step of utilizing ICP RIE includes forming fluid fill-holes in said substrate for passage of said fluid.

4. The method of claim 1 wherein said step of utilizing ICP RIE includes:
    providing a first dielectric layer on a first surface of said substrate;
    providing a second dielectric layer on a second surface of said substrate;
    patterning said first dielectric layer to define an etch pattern for said ICP RIE; and
    using said second dielectric layer as an etch-stop layer for said ICP RIE.

5. The method of claim 4 wherein said step of utilizing ICP RIE includes forming bores in a direction from said first surface to said etch-stop layer.

6. The method of claim 4 wherein said steps of providing said first and second dielectric layers include forming thermal oxidation layers.

7. The method of claim 4 further comprising a step of forming a heater on said second surface for manipulation of said fluid.

8. The method of claim 1 wherein said step of utilizing ICP RIE includes forming a structurally weakened edge portion of said substrate for subsequent removal of said edge portion.

9. A method of fabricating a matrix of switching elements comprising the steps of:
    providing a waveguide substrate having an array of first optical paths and an array of second optical paths which intersect said first optical paths at trenches, said arrays being on a waveguide surface of said waveguide substrate;
    forming a heater and fluid feed arrangement such that liquid is selectively supplied to and removed from intersections of said first and second optical paths, including employing ICP RIE techniques to form said arrangement.

10. The method of claim 9 wherein said step of employing ICP RIE techniques includes etching fluid fill-holes.

11. The method of claim 10 wherein said step of etching fluid fill-holes includes etching passages through a heater substrate having a pattern of heaters that has a correspondence to a pattern of said intersections of said first and second optical paths.

12. The method of claim 9 wherein said step of providing said waveguide substrate includes forming an array of waveguides to define said first and second optical paths.

13. The method of claim 11 further comprising forming an etch-stop layer on one side of said heater substrate and forming a patterned layer on the opposite side of said heater substrate, said patterned layer defining locations of said fluid fill-holes during said etching of said fluid fill-holes.

14. The method of claim 13 wherein said etching step forms passages through said heater substrate in the direction of said etch-stop layer.

15. The method of claim 11 further comprising a step of bonding said heater substrate to said waveguide substrate.

16. The method of claim 11 further comprising a step of utilizing said ICP RIE techniques to define a structurally weakened edge portion of said heater substrate.

* * * * *